No. 12,279. REISSUED OCT. 25, 1904.

W. F. KIESEL, Jr.

DOOR OPERATING GEAR FOR COAL OR COKE CARS.

APPLICATION FILED JULY 5, 1904.

3 SHEETS—SHEET 1.

WITNESSES:

M. E. Verbick.

Harriet Mitchell

INVENTOR

William F. Kiesel Jr.

BY

Eugene Diven

Attorney

No. 12,279. REISSUED OCT. 25, 1904.

W. F. KIESEL, JR.

DOOR OPERATING GEAR FOR COAL OR COKE CARS.

APPLICATION FILED JULY 5, 1904.

3 SHEETS—SHEET 2.

WITNESSES:

M. E. Verbeck.

Harriet Mitchell

INVENTOR

William F. Kiesel Jr.

BY

Eugene Owen

ATTORNEY

No. 12,279. REISSUED OCT. 25, 1904.

W. F. KIESEL, Jr.

DOOR OPERATING GEAR FOR COAL OR COKE CARS.

APPLICATION FILED JULY 5, 1904.

3 SHEETS—SHEET 3.

WITNESSES:

M. E. Verbeck.

Harriet Mitchell

INVENTOR

William F. Kiesel Jr.

BY

Eugene Diven

ATTORNEY

No. 12,279. Reissued October 25, 1904.

UNITED STATES PATENT OFFICE.

WILLIAM F. KIESEL, JR., OF ALTOONA, PENNSYLVANIA.

DOOR-OPERATING GEAR FOR COAL OR COKE CARS.

SPECIFICATION forming part of Reissued Letters Patent No. 12,279, dated October 25, 1904.

Original No. 726,541, dated April 28, 1903. Application for reissue filed July 5, 1904. Serial No. 215,413.

*To all whom it may concern:*

Be it known that I, WILLIAM F. KIESEL, Jr., a citizen of the United States, residing at Altoona, in the county of Blair and State of Pennsylvania, have invented a new and Improved Door-Operating Gear for Coal or Coke Cars, of which the following is a specification.

This invention relates to improvements in the mechanisms by which the doors which close the openings from the dumping-chutes in coal and coke cars are opened and closed, and is applicable more particularly to cars having side delivery-chutes and constructed in the manner described in my United States Letters Patent No. 726,541, dated April 28, 1903, for improvements in steel-car construction.

The object of my improvements is to provide mechanism whereby the doors on one side or the other, or on both sides, will be simultaneously closed or opened by means of an operating-shaft and capstan operated from one end of the car and whereby they will be held securely locked in their opened or closed positions.

I attain my object by means of the construction and arrangement of the several parts of the operating-gear, as illustrated in the accompanying drawings, in which—

Figure 1:
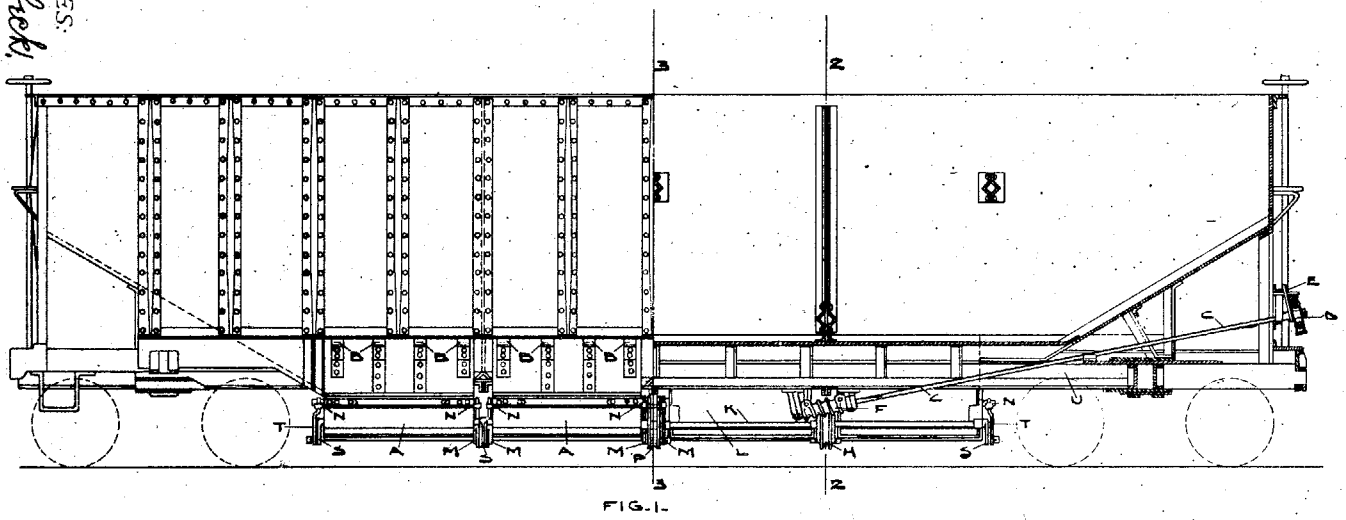
Figure 5:
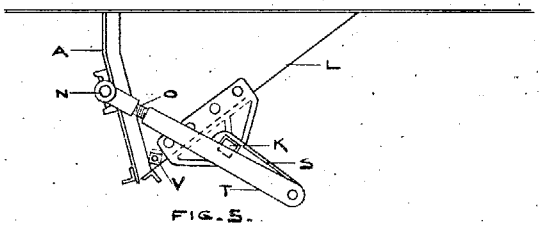
Figure 4:
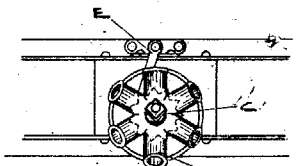
Figure 2:
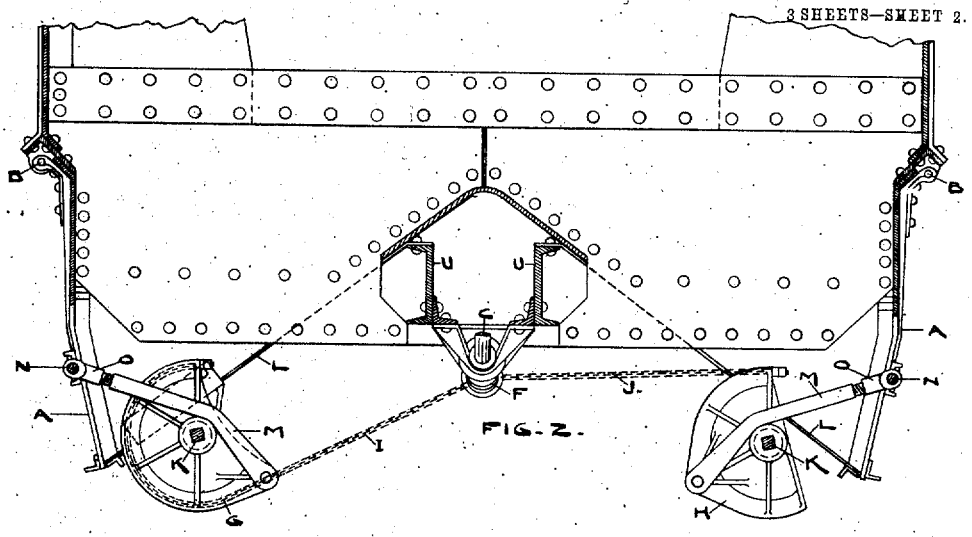
Figure 3:
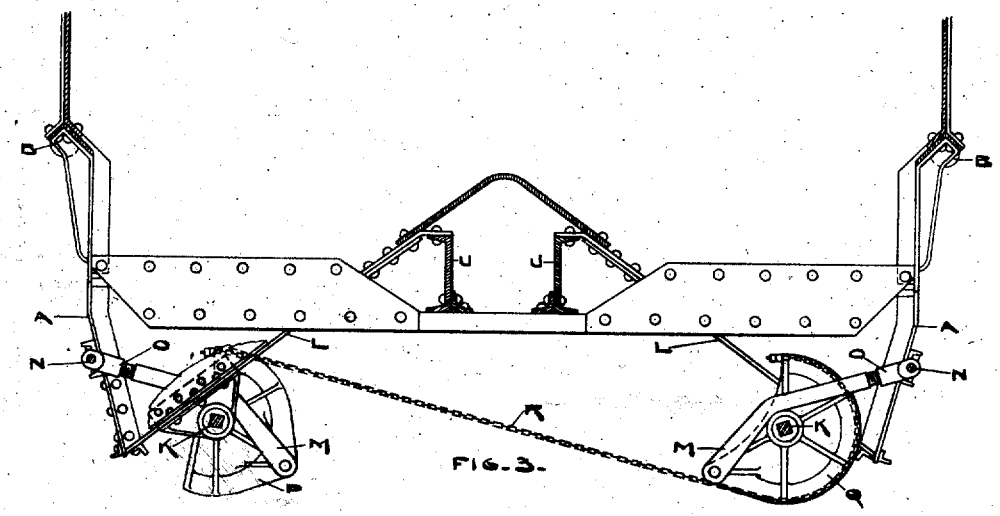
Figure 6:
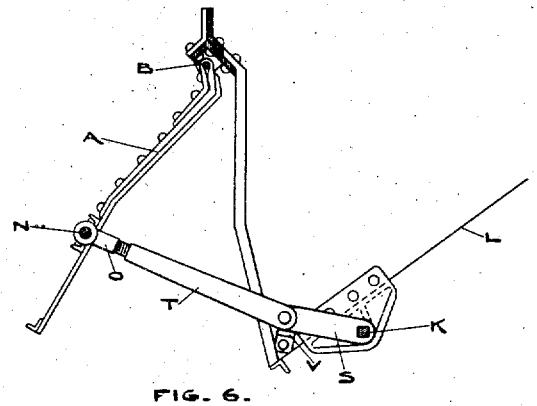

Figure 1 represents a side elevation of a car, partly in mid-section, with my door-operating gear applied thereto; Fig. 2, a transverse section of the lower portion of the car on the line 2 2 in Fig. 1; Fig. 3, a similar section on the line 3 3 in Fig. 1; Fig. 4, a detail showing an end view of the capstan and operating-shaft; Fig. 5, a detail showing one of the end doors with its operating toggle-arm and connecting-link; Fig. 6, a detail showing the same in full open position, and Fig. 7 a modification showing the gear arranged for operating the doors upon one side or the other separately.

Like letters of reference designate like parts in the several views.

In Fig. 1 is shown a steel car intended for the transportation of coal, coke, ores, and like commodities in which the contents of the car are delivered from the bottom sides thereof by way of the outwardly-inclined chutes, the openings from which are closed by substantially vertically-hung doors A, supported on the hinges B. The form of these inclined chutes is indicated more clearly in Figs. 2 and 3, where L indicates the bottom plate of the chutes. In order to hold these doors closed against the weight of the contents of the car, it is evident that a strong and efficient closing mechanism must be employed both to operate the doors and to hold them locked in closed position. This is accomplished in my gear when the doors on both sides are to be opened or closed simultaneously by means of the single operating-shaft C, which is centrally located underneath the body of the car, said shaft passing on an incline from the capstan-head D at one end of the car to the chain-worm F, situated in line with the first pair of combined sheaves and toggle-arms G and H, by which the toggle-shafts K for opening and closing the doors on each side are operated. The shaft C passes down from the capstan between the center sills U U of the car and is supported thereby in suitable hangers or brackets. Supported in suitable brackets at the under side of the bottoms L of the chutes and passing along the entire length of the chutes on each side are the toggle-shafts K, which between the first and second chutes carry the combined sheaves and toggle-arms G and H. These sheaves are of segment shape, with grooved peripheries to receive the operating chains or cables I and J, which pass therefrom to the worm F, said chains being connected to the opposite ends of the worm and so applied thereto that one chain will be wound off from the worm as the other chain is being wound thereon when the shaft C is turned in one direction or the other. This arrangement of the sheaves and worm is shown in Fig. 2.

Between the two middle chutes are located the combined sheaves and toggle-arms P and Q, similar to the sheaves G and H, but placed in reversed position, these sheaves being connected the one to the other by the chain R, as shown in Fig. 3. At each side of these sheaves G and H P and Q are coupled the bent connecting-links M, the outer ends of which are connected, by means of the adjustable eyes O, to pins or trunnions N, projecting from each side of the doors A. In the positions assumed by these parts when the doors are closed it will be seen that the pull on the links due to the outward pressure of the contents of the car against the doors as transmitted to the sheaves tends to rotate the sheaves in the opposite direction from that required to open the doors, since the pins by which links M are coupled to the sheaves lie below the lines passing through the centers of shafts K and pins N, and the links, resting, as they do, upon the hubs of the sheaves, as well as the chain connections, oppose this reverse rotation. In order to open the doors, the sheaves must be rotated so as to throw links M upwardly and outwardly. This will be accomplished by turning the shaft C from left to right, (see Fig. 2,) by which the chain I will be wound upon the worm F, thereby giving a right-to-left rotation to sheave G. As the shaft K rotates it imparts a similar motion to the sheave P, thereby winding chain R upon said sheave and transmitting a left-to-right rotation to sheave Q, by which motion is imparted to the shaft K on the other side of the car, and the simultaneous opening of the doors on both sides of the car is thereby accomplished. Since the chain J is unwound from the worm F at the same time that the chain I is wound thereon, the required left-to-right rotation of sheave H is permitted as imparted thereto by the rotation of the shaft K on that side of the car.

In order that the doors not adjacent to the sheaves may be operated by the shafts K, I provide toggle-arms S at each end of the shafts and also between the third and fourth chutes, the end toggle-arms being connected to the doors by the straight links T, as shown in Fig. 5, and the intermediate toggle-arms being connected to the doors by bent links M, similar to those shown in Figs. 2 and 3. It will be seen from an inspection of Fig. 5 that the links T at the ends of the shafts drop slightly below the center of shafts K when the doors are closed, since the pins coupling the links to the arms S are caused to pass beyond the line passing through the centers of pins N and shafts K, as already stated with reference to the sheave connections. The pull on the links T, therefore, is also in opposition to the opening movement of the arms S when the doors are closed.

By means of the adjustable eyes O, which are screwed upon the ends of the connecting-links, the lengths of these links are so adjusted as to bring them into the proper positions to insure the closing of the doors when the toggle-arms and sheaves are in their proper locking positions. The shaft C is locked when turned in the direction to close the doors by means of the pawl E, which engages a ratchet-wheel formed upon the inside of the capstan-head D, and by reversing the pawl the doors may be held at any desired degree of opening. The capstan-head is operated by means of bars inserted in the sockets and manipulated from the end of the car. To open the doors, the pawl E must be thrown over to engage the opposite side of the ratchet-wheel from the position shown in Fig. 4 and the capstan-head given a left-to-right rotation, whereby the connecting-links M and T are thrown up and out, the ratchet holding the doors from closing when thrown out from vertical position while the operating-bar is being moved from one socket of the capstan to the next. When the doors are fully open, the toggle-arms may be thrown around beyond their dead-centers, in which event the ratchet will be on the wrong side to resist the then turning effect of the doors on the arms, and in order to prevent the doors from closing, due to this position of the parts, I provide stops V to engage the arms S at each end of the chutes after said arms have passed slightly by their dead-centers, as shown in Fig. 6. When in this position, the doors are locked open until the shafts K are given a reverse rotation.

Figure 7:
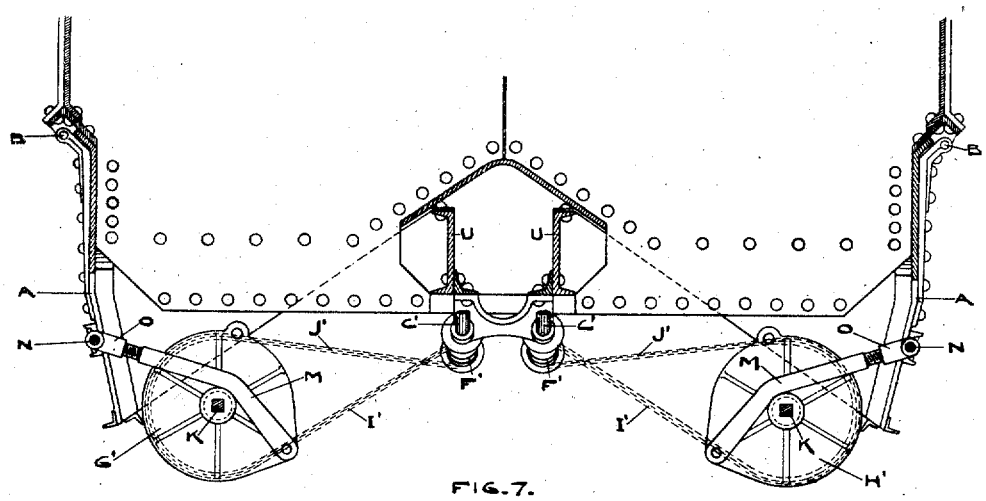

It may be desirable to operate the doors on one side independently of those on the other, and to accomplish this two operating-shafts C′ C′ (see Fig. 7) will be used, the worms F′ of which will be connected on each side with the sheaves G′ and H′, which latter will be circular in form and will have chains I′ and J′ running off and on from the worms, so that as the shafts, or either of them, are turned in one direction or the other the shafts K and their toggle-arms will be correspondingly rotated. The sheaves P and Q in this modification will of course be dispensed with and simple arms S substituted in their place. In other respects the toggle-arms and link connections will be the same. The shafts C′ C′ may both be run in from one end of the car, as indicated in Fig. 7, or they may be run in from opposite ends, in which case the doors on one side will be operated by a capstan-head at one end of the car and the doors upon the other side by a capstan-head at the other end of the car.

While I prefer to use a worm on the operating-shaft for receiving the sheave connections as the shaft is turned, since this allows me to set the shaft up closer to the center sills or floor of the car, I do not wish to be limited in this respect.

By means of my mechanism as above described it will be seen that the doors of the chutes may be positively opened and held locked at any degree of opening. It frequently occurs, especially with coke, that the contents of a car will become arched or clogged over the chutes, so as not to flow freely when the cars are dumped. If the doors be simply unlatched, they will swing back and forth as more or less of the contents of the car are broken out. With my arrangement, however, the doors may be positively fixed at any desired degree of opening, and the flow from the chutes may be governed and controlled accordingly.

Having thus described my operating-gear, what I claim as my invention, and desire to secure by Letters Patent, is—

1. In a car of the type described, the combination, with the chutes and hinged doors, of a shaft passing along beneath the chutes at each side of the car, toggle-arms on said shafts at each side of the doors, links coupling said arms to trunnions projecting from the sides of the doors, a central operating-shaft, a worm on said shaft in line with a pair of oppositely-disposed sheaves on the side shafts, chains or cables passing from the worm to said sheaves, one of said chains being run off the worm as the other is wound thereon by the rotation of the operating-shaft in either direction, whereby motion is imparted to one or the other of said shafts, a second pair of oppositely-disposed sheaves on the side shafts, a chain or cable passing from one of said sheaves to the other, whereby motion in one of the side shafts is imparted to the other, and means for turning the operating-shaft in either direction.

2. In a car of the type described, the combination, with the chutes and hinged doors, of a system comprising a toggle-shaft with arms and links coupled to the sides of the doors from beneath the chutes, whereby all the doors on a side may be simultaneously opened or closed, an operating-shaft running in from the end of the car, connections between said shaft and the toggle-shaft, whereby motion may be imparted thereto in either direction, and a capstan-head on the operating-shaft at the end of the car by which to turn said shaft.

3. In a car of the type described, the combination, with the chutes and hinged doors, of a system comprising a toggle-shaft with arms and links coupled to the sides of the doors from beneath the chutes, whereby the doors may be opened or closed, an operating-shaft, connections between said shaft and the toggle-shaft, whereby motion may be imparted thereto in either direction, means for turning said operating-shaft, and a pawl and ratchet applied to said shaft to control the opening or closing of the doors.

4. In a car of the type described, the combination with the chutes and hinged doors, of a system comprising a toggle-shaft, toggle-arms on the shaft between the doors and at each end thereof, bent links coupling the intermediate toggle-arms to the doors at each side and straight links coupling the end arms to the end doors, the points of attachment of all said links to said arms being thrown past the line running through the center of the shaft and the points of attachment to the doors when the doors are closed, and the points of attachment of the end links to their arms being thrown past said line when the doors are fully opened, stops to limit the throw of the end arms when the doors are opened, and means for operating the shaft in either direction.

5. The combination, in a door-operating mechanism, of a toggle-shaft, a toggle-arm on said shaft, a link coupling said arm to the door, a sheave on said shaft, a worm and operating-shaft, and connections between the worm and sheave whereby the toggle-shaft may be turned in either direction to open or close the door.

6. The combination, in a door-operating mechanism, of a toggle-shaft, a toggle-arm on said shaft, a link coupling said arm to the door, a sheave on said shaft, an operating-shaft, a connection between the sheave and the operating-shaft, and means for winding said connection on and off from the operating-shaft, whereby the toggle-shaft may be turned in either direction to open or close the door.

In testimony whereof I have affixed my signature in presence of two witnesses.

WILLIAM F. KIESEL, JR.

Witnesses:

WILLIAM R. GEESEY,

B. S. BROWN.